Aug. 13, 1935.    E. L. KRAFT    2,011,059
WINDSHIELD FOR AUTOMOBILES
Filed Feb. 15, 1932    3 Sheets-Sheet 1

Inventor
Edward L. Kraft
By Bacon & Thomas
Attorneys

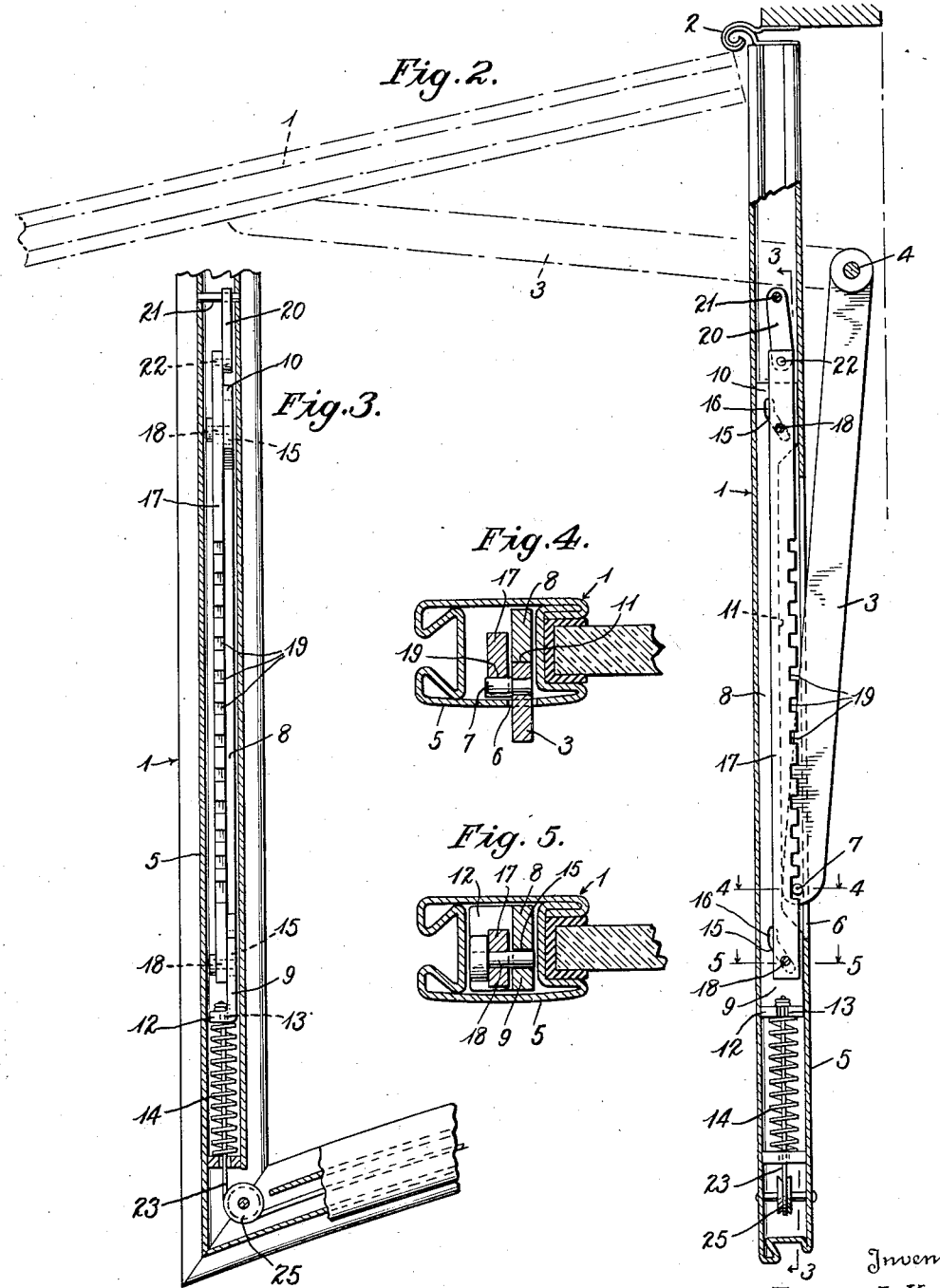

Aug. 13, 1935.  E. L. KRAFT  2,011,059
WINDSHIELD FOR AUTOMOBILES
Filed Feb. 15, 1932  3 Sheets-Sheet 3

Inventor
Edward L. Kraft
By Bacon & Thomas
Attorneys

Patented Aug. 13, 1935

2,011,059

UNITED STATES PATENT OFFICE 2,011,059

WINDSHIELD FOR AUTOMOBILES

Edward L. Kraft, York, Pa., assignor to Martin-Parry Corporation, York, Pa., a corporation of Delaware Application February 15, 1932, Serial No. 593,159

1 Claim. (Cl. 296—84)

This invention relates to automobile windshield adjusting mechanism and constitutes an improvement upon the construction disclosed and claims in the Beitman Patent No. 1,821,903, dated September 1, 1931.

An object of the present invention is to provide a rack which is adapted to be moved into and out of the path of movement of a pin carried by the bracing arm of a shield whereby the operator may adjust the shield when the rack is in its retracted position and protract the rack into operative condition to hold the clamp in any desired position.

From a more specific standpoint, the invention comprehends the provision of means for causing bodily movement of the rack within the sash into operative or inoperative position by means of a cable or the like operated by a handle concealed within the windshield channel frame.

Other objects of a more subordinate nature will be apparent to those skilled in the art from a reading of the following specification in conjunction with the drawings attached hereto and forming a part hereof in which:

Fig. 2 is a cross section;

Fig. 3 is a detail view showing the operating mechanism for the ratchet;

Fig. 4 is a cross sectional view on line 4—4 of Fig. 2;

Fig. 5 is a cross sectional view on line 5—5 of Fig. 2;

Figure 1:
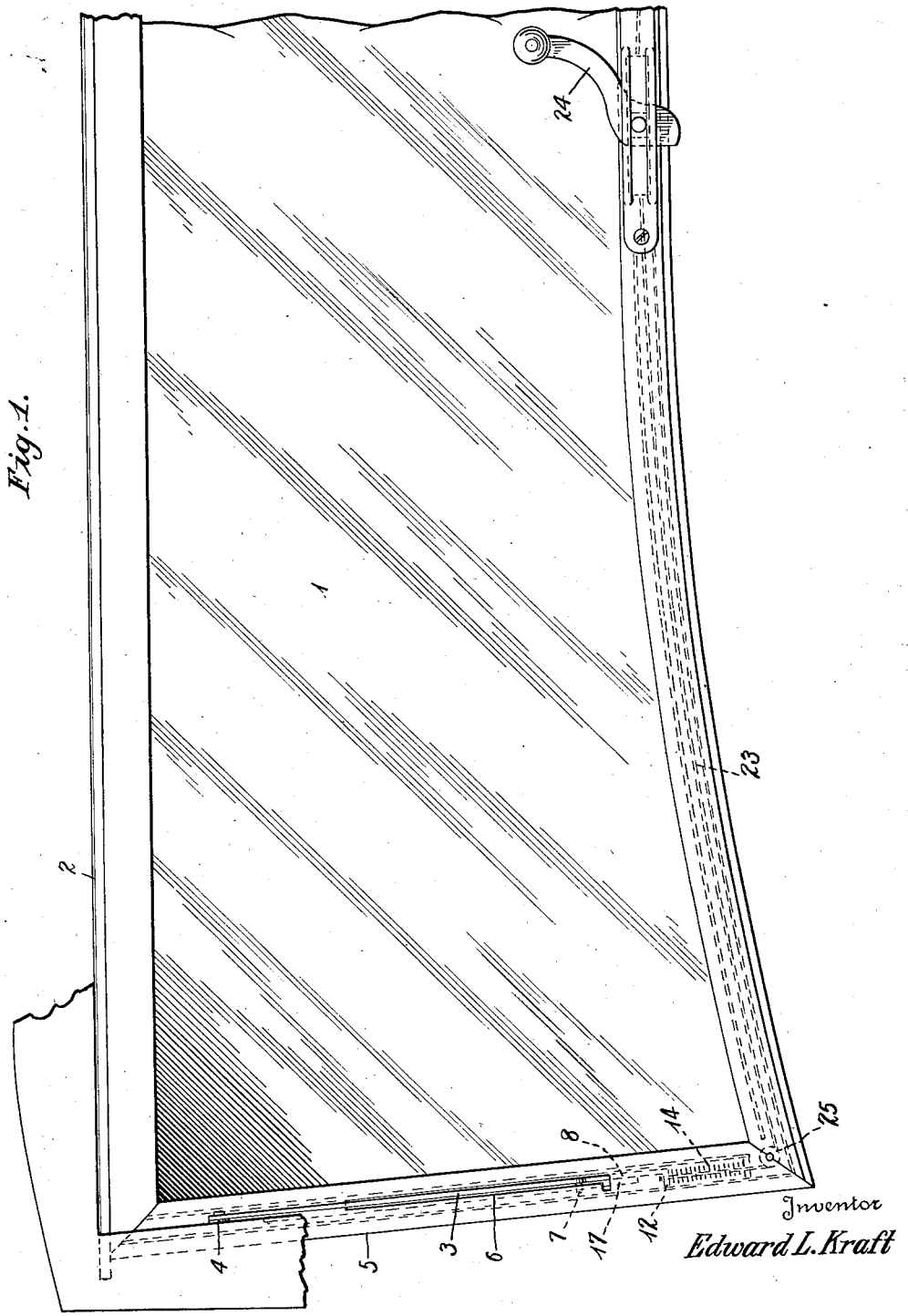
Fig. 1 is a front elevation.

Referring now more specifically to the drawings wherein like reference characters indicate corresponding parts, I represents a swinging windshield of any desired type which is preferably hinged to the automobile frame by a piano hinge 2. This shield is provided with one or more bracing arms 3 hinged to the windshield frame as at 4 and slidably connected at its other end within the channel sash 5 having a slot 6. The bracing arm has an offset locking pin 7 which restrains the end of the bracing arm from leaving the sash. Within the metal channel sash 5, I provide what may be termed a reciprocating lever 8 which has enlarged heads 9 and 10 fitting snugly within the metal sash but free to slide relative thereto in the manner hereinafter described. The intermediate portion of the locking lever is cut out as at 11. The lower end of the reciprocating lever has an inwardly extending flange 12 provided with the slot 13 abutting against a helical spring 14 secured within the lower part of the sash frame, as shown, and normally abutting the inturned flange to urge it upwardly. The reciprocating lever has a plurality of diagonally shaped slots 15 having straight terminal portions 16.

For locking and unlocking the bracing arm, I provide a movable rack 17 which is provided with laterally extending pins 18 fitting within the slots 15 and 16 respectively provided by the reciprocating lever. The end of the bracing lever has a pin 7, as aforesaid, which is adapted to be engaged or disengaged by said movable rack having the series of notches 19, as shown. The movable rack 17 is preferably secured at its upper end to a link 20 hinged to the frame as at 21, the connection between the rack and link being provided by a pin 22 carried by the upper end of the rack meshing with an opening in the swinging link 20. This connection permits the rack to swing back and forth in the manner hereinafter to be described.

Within the confines of the metal frame of the shield, I provide a cable 23 which is adapted to be actuated by a handle 24 preferably situated at the central portion of the lower marginal edge of the metal channel sash. A pulley 25 is provided by the end portions of the sash over which the cable is trained. The upper end of the cable extends through the central portion of the helical spring 14 and through the slot 13 provided by the inturned flange 12 of the reciprocating lever.

The operation of the device is as follows:

When the cable is tightened it pulls down the reciprocating lever 8 against the tension of the helical spring. The reciprocating lever is restrained from lateral movement by its snug fit within the metal sash, but due to the pin and slot connection between the reciprocating lever and the rack respectively, a reciprocating movement of the lever imparts to the rack a transverse bodily movement to retract or project the same as may be desired. When pulled downwardly, the rack is caused to retrench into a position where the pin provided by the bracing lever is free from engagement within the various notches provided by the rack. Consequently, in that position the shield can be freely moved back and forth until a selected position of adjustment has been reached, and a release of the handle 24 causes the spring to re-assert itself against the flanged end of the reciprocating lever thereby causing a transverse projecting movement of the rack into its operative position where it engages the pin provided by the bracing arm to hold the shield in that position of adjustment. This backward and forward swinging movement of the rack is permitted because of its hinged connection to the link 21 as above described, which permits the rack to swing in accordance with the degree of movement and the direction thereof imparted to the reciprocating lever 8.

It will be seen that the rack, because of the square formation of the teeth and the manner in which it operates, restrains inadvertent movement of the shield in either its upward or downward position. Thus, vibration cannot cause the shield to inadvertently move in an upward direction nor can the shield move in a downward direction because of the positive locked engagement provided by the square notches and the pin provided by the free end of the bracing arm. The entire assembly is concealed so that maximum vision is obtained and the rack returns automatically, by virtue of the spring, to its operative position when the handle is released thereby overcoming the necessity of positive manual control for both locking and unlocking the connection between the bracing arm and the shield.

Figure 6:
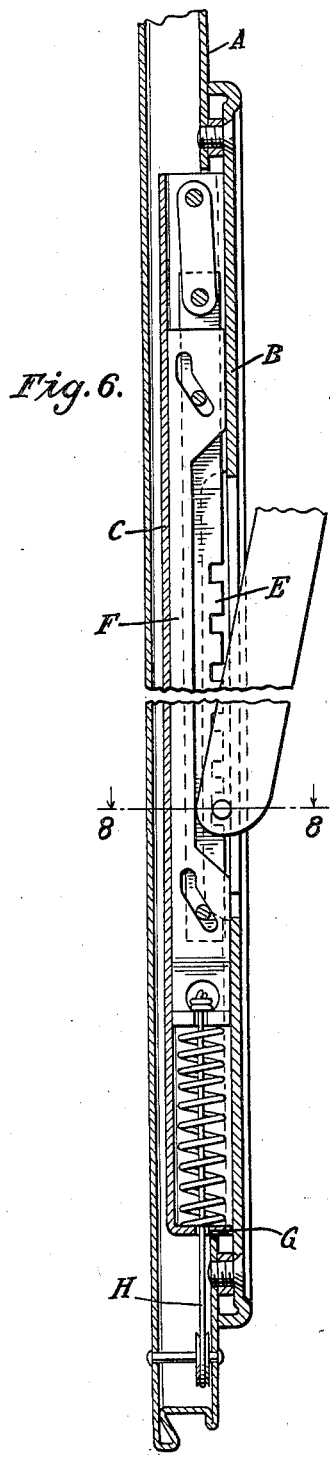
Fig. 6 is a modification showing a unit assemblage of the operating mechanism which is applied to the sash.
Figure 7:
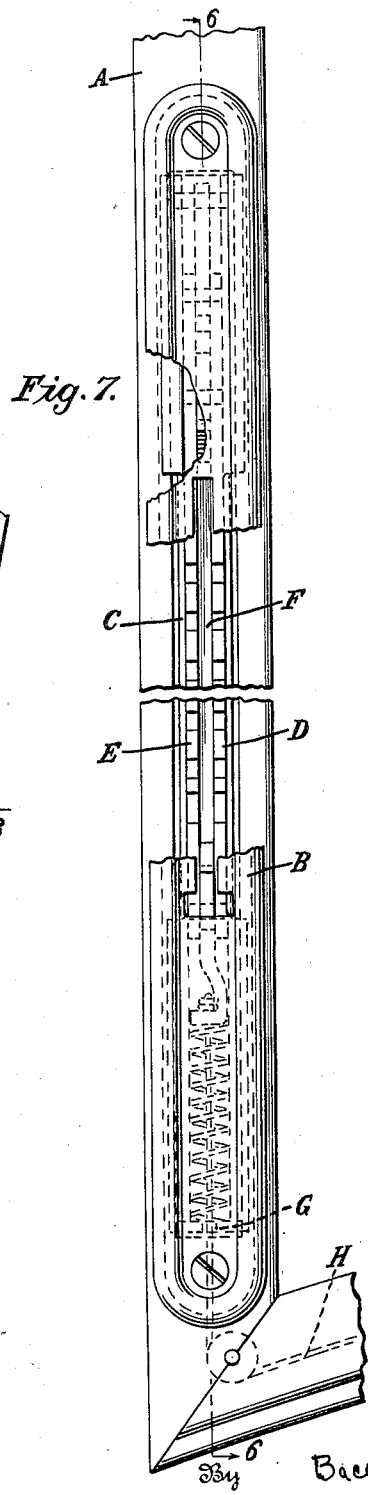
Fig. 7 is a front view thereof.
Figure 8:
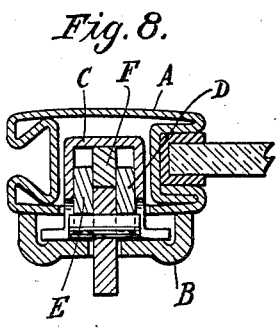
Fig. 8 is a cross section taken on line 8—8 of Fig. 6.
Figure 9:
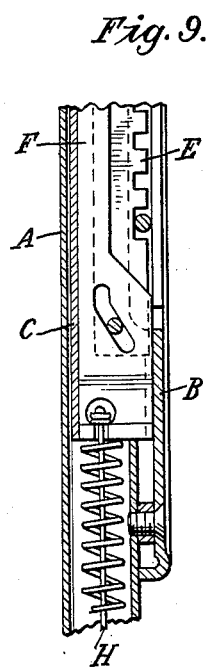
Fig. 9 is a detail view of a slightly different construction.

In Figs. 6 to 9, I have disclosed a somewhat different invention. According to this structure, the rack and reciprocating bar, spring, etc. are secured together as a unitary assemblage and may be applied to a slotted portion of the channel sash and screwed into place. It may be removed as a unit for the purposes of repair. The sash A is provided with a slotted portion and the unit comprises a slotted face plate B to which is secured a U-shaped casing C housing the racks D and E and the intermediately disposed reciprocating bar F. The lower part of the housing is apertured as at G for receiving the cable H.

I am aware that many changes in details may be made without departing from the spirit of my invention. Thus, for example, instead of providing a pulley 25, a pivoted bell crank connecting the cable with the reciprocating lever may be employed. I do not, therefore, wish the claim to have unnecessary restrictions other than such as may be necessary by the state of the art.

What I claim is:

In combination, a windshield frame, a windshield mounted therein for outward swinging movement, said windshield being provided with a metal channel sash, a brace arm hinged at one end to the automobile frame and having a sliding connection within a slot provided by the metal channel sash at its adjacent end, a locking pin provided by the free end of the brace arm, a swingable rack bar located within the channel sash, a reciprocating lever, a diagonal pin and slot connection between the reciprocating lever and the rack bar, means for reciprocating said lever and for causing a transverse movement of said rack bar into a position where it either engages or disengages with the locking pin provided by the brace arm.

EDWARD L. KRAFT.